(12) United States Patent
Wishart (10) Patent No.: US 8,531,072 B2
(45) Date of Patent: Sep. 10, 2013

(54) DUAL-MODE COUNTER-ROTATING-TO-TRADITIONAL ELECTRIC MOTOR AND SYSTEM

(75) Inventor: Randell J. Wishart, Reno, NV (US)

(73) Assignee: E-Wish Technology, LLC, Reno, NV (US)

(*) Notice: Subject to any disclaimer, the term of this patent is extended or adjusted under 35 U.S.C. 154(b) by 210 days.

(21) Appl. No.: 13/199,865

(22) Filed: Sep. 12, 2011

(65) Prior Publication Data

US 2012/0206004 A1 Aug. 16, 2012

Related U.S. Application Data

(60) Provisional application No. 61/463,364, filed on Feb. 16, 2011.

(51) Int. Cl.
*H02K 23/60* (2006.01)
(52) U.S. Cl.
USPC ............... 310/121; 310/75 C; 310/114
(58) Field of Classification Search
USPC ............ 310/112, 114–116, 118, 121, 67 A, 310/75 C
See application file for complete search history.

(56) References Cited

U.S. PATENT DOCUMENTS

| | | | |
|---|---|---|---|
| 2,431,255 A | 11/1947 | Jenkins | |
| 2,456,993 A | 12/1948 | Rambo | |
| 2,462,182 A | 2/1949 | Guerdan | |
| 3,738,270 A | 6/1973 | Hargett | |
| 4,056,746 A * | 11/1977 | Burtis | 310/115 |
| 4,259,604 A | 3/1981 | Aoki | |
| 4,375,047 A | 2/1983 | Nelson | |
| 4,645,963 A | 2/1987 | Plackner | |
| 5,067,932 A | 11/1991 | Edwards | |
| 5,089,734 A | 2/1992 | Bickraj | |
| 5,262,693 A | 11/1993 | Holka | |
| 6,433,451 B1 | 8/2002 | Cherciu | |
| 7,466,053 B1 * | 12/2008 | Radev | 310/114 |
| 2003/0057793 A1 * | 3/2003 | Yang | 310/191 |
| 2006/0163963 A1 | 7/2006 | Flores, Jr. | |
| 2006/0279153 A1 | 12/2006 | Barreiro | |
| 2007/0013244 A1 * | 1/2007 | Kinkaid | 310/75 C |
| 2007/0090702 A1 * | 4/2007 | Schiller | 310/75 C |
| 2008/0048530 A1 * | 2/2008 | Peng et al. | 310/67 A |
| 2008/0085798 A1 * | 4/2008 | Miller et al. | 474/78 |
| 2010/0164334 A1 * | 7/2010 | Schiller | 310/75 |
| 2010/0259120 A1 * | 10/2010 | Karaki et al. | 310/83 |

OTHER PUBLICATIONS

Counter-Rotating Permanent Magnet Brushless DC Motor for Underwater Propulsion, by J. Qui et al., IPEMC 2006.
Anti-Directional-Twin-Rotary Motor Drive for Electric Vehicles, by Atsuo Kawamura, et al., p. 453, 1994 IEEE.
Analysis of Anti-Directional-Twin-Rotary Motor Drive Characteristics for Electric Vehicles, by Atsuo kawamura, et al., IEEE TIE, vol. 44, No. 1, Feb. 1997.
Korean Intellectual Property Office, International Search Report and Written Opinion issued on Jan. 10, 2013 for corresponding International Patent Application No. PCT/US2012/025187 (pp. 1-9) and claims searched (pp. 10-17) pp. 1-17.

* cited by examiner

*Primary Examiner* — Thanh Lam
(74) *Attorney, Agent, or Firm* — James M. Ritchey (57) ABSTRACT

Disclosed is a counter-rotating electric motor that includes an outer rotational component, an oppositely rotating inner rotational component, a force output system coupled to the outer rotational component, another force output means coupled to the inner rotational component, and an assembly for reversibly halting one of the rotational components, thereby converting the counter-rotating electric motor into a traditional motor.

26 Claims, 4 Drawing Sheets

DUAL-MODE COUNTER-ROTATING-TO-TRADITIONAL ELECTRIC MOTOR AND SYSTEM

CROSS-REFERENCE TO RELATED APPLICATIONS

This application claims priority from U.S. provisional application Ser. No. 61/463,364 filed on Feb. 16, 2011.

BACKGROUND OF THE INVENTION

1. Field of the Invention

The subject invention relates to an increased efficiency counter-rotating electric motor that, upon demand, converts into a traditional electric motor, thereby producing a device that operates in efficient power output ranges at both slow rpm and high rpm circumstances. Specifically, the subject invention utilizes a counter-rotating electric motor in which both an armature or inner rotational member and a stator or outer rotational member rotate in opposite directions during operation. Generally, the subject motor is configured as a separate motor (that may be mounted in a vast variety of motor-containing systems as desired) with two oppositely rotating output drives or for a vehicle is mounted at the center of one wheel (hub motor) of the selected wheeled vehicle, wherein the armature output drive means is attached to and extends from the armature of the hub motor to either the same wheel or a second wheel of the vehicle and a wheel and tire extends from the stator of the subject hub motor and includes a rotation reversal means for the armature to produce a common rotational direction for both the stator and armature to drive the vehicle. For example, with an adapted bicycle, the counter-rotating hub motor may be located in the rear wheel and configured so that the outer rotational member (stator) directly powers the wheel containing the hub motor and the inner rotational member (armature) indirectly powers the same wheel, but after its rotational direction is reversed and coupled back into the outer rotational member. Also, for example, with an adapted tricycle, the counter-rotating hub motor may be located in one of the rear wheels and configured so that the outer rotational member (stator) powers the wheel containing the hub motor and the inner rotational member (armature) powers the second rear wheel (the one without the hub motor).

As indicated, both the armature (inner rotational member) and the stator (outer rotational member) rotate, in opposite directions, thereby minimizing the creation of heat during operation and accessing torsional forces normally lost by utilizing a traditional motor in which the stator is fixed within the motor housing and the armature rotates (or the armature is fixed and the stator rotates in other equivalent configurations like a hub motor).

Included in the subject invention is means to brake/stop the rotation of the armature (or stator, if so desired), thereby converting the counter-rotating motor into a traditional motor in which only one element rotates (again, depending on the desired configuration either the outer/stator rotational member or the inner/armature rotational member). Again using a powered vehicle as an example, the benefit of this dual-mode functioning ability is that at slower vehicle speeds the high efficiency and high torque output operational mode of the counter-rotating motor is utilized and when a higher vehicle speed is desired the subject system may be converted into a traditional motor by halting the rotation of one of the rotating members (for a hub motor the armature is stopped, thereby directing all of the output force directly to the stator/wheel).

2. Description of Related Art

For a traditional brush-containing DC motor, the outside/surrounding motor housing is stationary, as is the stator/field magnets within the housing. Normally, the stator is usually affixed to the housing. An internal armature/rotor is attached to a shaft or axle that rotates during operation (in some versions of a standard motor the rotor may be termed the armature). Thus, the armature shaft/axle extends out from the stationary motor housing and rotates when electrical current is applied to the motor (the armature/rotor rotates within the stationary stator/field magnets). In brush-containing motors, physical brushes are required to transmit the electricity from the outside source to the rotor via a commutator interfacing that pulses the current to alternate the field polarity in the coils of the armature, thereby generating the rotational driving force used to turn the armature. The history of traditional brush-containing electric motors is extensive and one version is found at www.sparkmuseum.com/MOTORS.HTM.

For a traditional brushless DC motor, the outside/surrounding motor housing is, again, stationary, as is the stator within the housing. Normally, the stator is usually affixed to the housing. An internal armature/rotor is attached to a shaft or axle that rotates during operation. Thus, the armature shaft/axle extends out from the stationary motor housing and rotates when electrical current is applied to the motor (the armature/rotor rotates within the stationary stator/field magnets). In brushless motors, physical brushes are not required to transmit the electricity from the outside source to the rotor. The configuration of brushless motors permits either a design utilizing permanent magnets affixed to the stator or, more commonly, the permanent magnets are associated with the armature and the field windings are located in the stationary stator. Clearly, brushless motors do not use physical brushes for commutation; instead, they are electronically commutated by standard techniques. To produce rotational movement, suitably pulsed currents are delivered to the windings and timed via incorporated means such as the application of standard Hall Effect sensors/magnets, back emf, and equivalent means. Brushless DC motors have many well-known advantages over brush-containing motors.

Even though an extremely limited number of specialty counter-rotating brush-containing DC motors are described in published patents (see immediately below), it is stressed that no references have been discovered that utilize, suggest, hint, teach, or imply a counter-rotating electric DC motor that operates via a brushless technology in which both the armature (inner rotational member) and the stator (outer rotational member) physically rotate in opposite directions while maintaining continuous electrical contact with exterior control and power elements.

A counter-rotating electric DC motor is described in related U.S. Pat. Nos. 2,431,255, 2,456,993, and 2,462,182. The disclosed motor was to be used in torpedo propulsion systems in which a coaxial propeller assembly drove separate propellers in opposite directions to aid in keeping the torpedo traveling in a desired direction. Clearly, the operational lifetime of such a motor is extremely limited, given its destruction upon hitting a target. To eliminate necessary centrifugal/centripetal influenced commutator-to-brush contact breaks created while the stator is rotating (normally the stator is not rotating so a constant resilient means or spring simply forces a brush inward and towards the center of rotation, thereby contacting the commutator for the required electrical communication, but rotation of the stator causes the brushes to "float" away from the commutator), the device contained a "radial commutator" (a disk extending outwardly from the axis of rotation) and contact brushes directed parallel to the axis of rotation. This radial commutator/brush design is complex, not easily fabricated, and, thus, expensive to manufacture.

In U.S. Pat. No. 3,738,270 a brushless electric DC motor for a torpedo is disclosed. To maintain stability during its course in water to its target, oppositely rotating propellers are beneficial. The design utilizes a stationary stator around which two independent armatures rotate in opposite directions to drive the associated propellers in corresponding opposite directions.

U.S. Pat. No. 4,056,746 presents a counter rotation electric motor that is quite similar to the design present immediately above ('270). Once again a radial commutator/brush design is utilized in the operation of the device. An interesting analysis of the benefits of a counter-rotating motor is presented: 1) increasing the field cutting speed of the armature to increase power output of the motor; 2) minimizing field collapse; and 3) maintaining the angular rate of the armature which is compatible with the containment of the generated centrifugal forces. There is no discussion, suggestion, implication, or teaching that the related motor was more efficient in using less input energy and producing more output work. It is stressed that it has been discovered that the subject invention dramatically increases the efficiency of subject counter-rotating motor.

A DC rotary machine is related in U.S. Pat. No. 4,259,604. The commutator/brush design in this device is very simplistic and is not created to operate at high rotational velocities. Typically, the motor is used in a machine such as a tape recorder, VTR, and the like that need low rotational speeds. The commutator is of standard cylindrical design and the brushes are contacted in a permanent fashion against the commutator bars.

U.S. Pat. No. 4,375,047 presents a torque compensating electrical motor. This device is comprised of two motors, either next to one another in a serial connection or inside one another. The armature is attached to the axle and is utilized for output work. The stator rotates, but is attached to nothing but the supporting bearings, and is spinning to simply eliminate internal torque and not to produce work. The subject invention utilizes both the rotating armature and the rotating stator to generate work. A critical difficulty exists in this patent since the electrical connection are not described or discussed, except to say that the "motor control are well known and do not form part of the present invention" which is simply not a true and valid statement. The figures show only truncated wires coming from the field coils with no details concerning connection to "outside" power and control means. When counter-rotation of motor components is part of the operation of the device the means for electrical communication is critically important and extremely difficult to achieve. Apparently, the reference to "well known" implies some sort of undisclosed brush/commutator configuration (given the 1983 issue date) or a merely theoretical and non-enabled invention was related.

A rotating-field machine is described in U.S. Pat. No. 4,645,963. In this device, which is extremely similar to '047 immediately above, again, the armature is attached to the axle and is utilized for output work. The stator rotates, but is attached to nothing but the supporting bearings, and is spinning to simply rotate the field and not to produce work. Once again, the subject invention utilizes both the rotating armature and the rotating stator to generate work.

U.S. Pat. No. 5,067,932 discloses a dual-input motor in which two armatures rotate either together or in opposite directions within a stationary/fixed outer stator. The stator is rigidly affixed to a suspension member or other stationary anchor.

A dual rotary AC generator is described in U.S. Pat. No. 5,089,734. This disclosure presents, basically, a motor run in reverse, thereby becoming a generator in which both the magnetic field and armature rotate in opposite directions. Unfortunately, the manner in which the device receives or delivers electricity is not related, nor are any internal electrical components described.

U.S. Patent Publication No.: 2006/0163963 discloses a counter rotating generator. Once again, a radially disposed set of disks are utilized in the commutator/brush design. In this case, the slip rings have a relatively large diameter (which is claimed to decrease heat production) and contact brushes in a continual manner, with constant force, regardless of rotational speed. Additionally, the described generator is used in relatively slow RPM situations in which the wind or manual cranking are utilized as the driving forces, unlike the subject invention that may be operated from relatively low to relatively high RPM values.

Disclosed in "Counter-Rotating Permanent Magnet Brushless DC Motor for Underwater Propulsion," J. Qiu et al., IPEMC 2006 is a "theoretical" counter-rotational motor that was discussed via a test-bed that comprised two standard motors that rotated in opposite directions (an "attempt" to mimic a physically real counter-rotational motor). An extremely complex set of Hall Effect Sensors was theorized as being necessary to operate their motor, should an actual motor be fabricated, which did not occur. Additionally, slip-ring connectors were theorized as a means for electrical connections.

A brush-containing motor is related in two generally theoretical papers from Japan. A device labeled as an "Anti-Directional-Twin Rotary Motor" is described that utilizes multiple brushes and slip rings of considerable size to power the outer rotor or as the authors state "the size of the slip ring is not negligible." The analysis of their brush-containing motor presents and relies on many theoretical estimations and adjustments to the very limited data that was recorded. It is of particularly note that "the stator resistance was adjusted so that the theoretical torque-speed curve might fit the measured curve. No comments or comparisons of any sort are made or suggested between their twin-rotor motor and a motor in which one of the rotors is stopped. Clearly, due to the difficulty of actually operating their multi-brush/slip ring motor, much of the presented/plotted data is not actual physical collected data for a twin-rotor motor but "estimated" data from "equivalent" situations. Also, it is plainly stated that the incorporation of the brush/slip ring containing means decreases efficiency by at least 20%. The papers are: "Anti-Directional-Twin-Rotary Motor Drive for Electric Vehicles" by Atsuo Kawamura, et al., page 453, 1994 IEEE (0-7803-1993-1/94© 1994 IEEE) and "Analysis of Anti-Directional-Twin-Rotary Motor Drive Characteristics for Electric Vehicles" by Atsuo Kawamura, et al., IEEE Transactions on Industrial Electronics, Vol. 44, No. 1, February 1997 (0278-0046/97© 1997 IEEE).

Finally, a purely "theoretical" brush containing motor with a rotational stator is presented in expired U.S. Pat. No. 6,433,451. On its face, this is a completely non-functional and imaginary invention. This issued patent is, literally, filled with dozens of major errors, including: inconsistent statements; wrong/inappropriate equations; incorrectly and incompletely drawn figures; elements listed as being in the figures and not actually presented in the figures; and mechanically/electrically impossible configurations for the theoretical motor.

Brushes are clearly present in both FIGS. 1 and 2, yet the statement "[in FIG. 2] the new points for coupling of the mobile stator coils are 23 and 24" does not correspond to the numbers 23 and 24 being presented in any of the figures. The statement "the proposed motor" plainly indicates a theoretical motor was never constructed since what is shown in the figures would not come close to actually functioning or even being capable of one rotation (as is obvious from the figures, components would physically run into one another upon rotation). Additionally, the "electrical distributor 8" is not defined and the common definition of the term "distributor" presents an incorrect element. Further, the "Formulas Refresher" table presents a somewhat unrelated group of equations that are, mostly, utilized for linear motion and not appropriate in an analysis of rotational motion. Unfortunately, this patent was allowed to issue with all of the gross errors, untrue statements, and incorrect analysis.

BRIEF SUMMARY OF THE INVENTION

An initial object of the present invention is to provide a counter-rotating electric motor that operates with dual-mode capabilities in that it may be reversibly converted from a counter-rotating motor into a traditional motor mode upon demand.

A second object of the present invention is to provide a dual-mode counter-rotating electric motor adapted vehicle (e.g.: a bicycle; a tricycle; a quad-cycle; a motorcycle; an electric powered wheelchair; a personal mobility device; an automobile; a truck; a flying device; a boat; and the like) in which, for the counter-rotating motor mode, a first rotating member rotates in a first direction and a second rotating member rotates in an opposite second direction about a common central axis and then their opposite rotations are linked to appropriately configured output means to drive one or two wheels on a wheeled vehicle or one or two propellers of a water or air vehicle in a common direction and in the traditional motor mode one of the rotating members is stopped by suitable means.

A third object of the present invention is to provide a dual-mode counter-rotating electric hub motor adapted wheeled vehicle (e.g.: a bicycle; a tricycle; a quad-cycle; a motorcycle; an electric powered wheelchair; a personal mobility device; an automobile; a truck; and the like) in which, for the counter-rotating motor mode, the armature rotates in a first direction and the stator rotates in an opposite second direction about a common central axis and then their opposite rotations are linked to appropriately configured output means to drive one or two wheels of the vehicle over a supporting surface in a common direction and in the traditional motor mode armature is stopped by suitable means.

Another objective of the subject invention is to describe an adapted vehicle that includes a dual-mode counter-rotating DC/AC electric hub motor in which during a first mode of operation both a first wheel is powered by a first rotational member associated with the counter-rotating hub motor and a second wheel is powered by a second rotational member associated with the counter-rotating hub motor and in a second mode of operation only a first wheel is powered by a first rotational member.

Another objective of the subject invention is to describe an adapted vehicle that includes a dual-mode counter-rotating DC/AC electric hub motor in which during a first mode of operation both a wheel is powered by a first rotational member associated with the counter-rotating hub motor and the same wheel is powered by a second rotational member associated with the counter-rotating hub motor and in a second mode of operation the wheel is powered by only the first rotational member while the second rotational member is held fixed.

Yet a further objective of the subject invention is to disclose a dual-mode counter-rotating electric wheel hub motor adapted multi-wheeled vehicle in which a wheel/tire are secured to a rotating stator/outer rotational member and a central axle to a rotating armature/inner rotational member and allowing the mated stator to armature assembly to rotate freely with the armature-connected-axle rotating in one direction and the stator-connected-wheel/tire rotating in an opposite direction and then in a first mode of operation linking the armature-connected-axle rotation to a second wheel on the vehicle so that both wheels rotate in a common direction or in a second mode of operation causing only one wheel to receive power for rotation.

Still yet a further object of the subject invention is to disclose a dual-mode counter-rotating hub motor adapted multi-wheeled vehicle that includes an inner rotational member and an outer rotational member that rotate in opposite directions, wherein necessary electrical contact between outside power and control elements and the necessary inside control elements and windings is maintained via at least one electrically conductive bearing or equivalent non-brush electrical contact assembly.

Yet another object of the subject invention is to present a modified tricycle in which a wheel hub motor is adapted to become the subject dual-mode brushless counter-rotating DC/AC electric motor that includes in the counter-rotating wheel hub motor an inner rotational member and an outer rotational member that rotate in opposite directions, wherein necessary electrical contact between outside power and control elements and the necessary inside control elements and windings is maintained via at least one electrically conductive bearing or equivalent non-brush electrical contact assembly and a first drive output coupled to the outer rotational member powers a first wheel and a second drive output coupled to the inner rotational member powers a second wheel, wherein a dual-mode control system is included that, upon demand by a user, shifts operation between a traditional motor configuration with one rotational member rotating and a counter-rotational motor configuration with two rotational members rotating in opposite directions. Disclosed are novel embodiments of a dual-mode counter-rotating DC/AC electric motor adapted vehicles. More specifically, the subject invention may be exemplified in dual-mode brushless counter-rotating DC/AC electric hub motor adapted multi-wheeled vehicles. A embodiment of the subject invention comprises a counter-rotating electric motor having: an outer rotational member, wherein the outer rotating member rotates in a first direction about a central axis; an inner rotational member configured to rotate within the outer rotational member about the central axis, wherein the inner rotating member rotates in a second direction that is opposite to the first direction; a first force output means coupled to the outer rotational member; a second force output means coupled to the inner rotational member; means for powering the motor, thereby rotating the outer and inner rotational members in opposite directions; and means for reversibly slowing and halting one of the rotational members, thereby converting the counter-rotating electric motor into a traditional motor with one rotating rotational member and one reversibly halted rotational member. Usually, the reversible slowing and halting means comprises a braking assembly associated with one of the first and second force output means, wherein the braking assembly is frequently a disc-braking assembly. The motor is frequently a brushless counter-rotating electric DC/AC motor or a brushless counter-rotating electric DC/AC wheel hub motor.

Yet still a further object of the present invention is to provide a dual-mode counter-rotating electric motor adapted system in which, for the counter-rotating motor mode, a first rotating member rotates in a first direction and a second rotating member rotates in an opposite second direction about a common central axis and then their opposite rotations are linked to appropriately configured output means to power a desired system and in the traditional motor mode one of the rotating members is reversibly stopped by suitable means, thereby reversibly generating a traditional output means.

Generally, comprising the dual-mode counter-rotating-to-traditional electric motor is an outer rotational member, wherein the outer rotating member rotates in a first direction about a central axis, an inner rotational member configured to rotate within the outer rotational member about the central axis, wherein the inner rotating member rotates in a second direction that is opposite to the first direction, and means for reversibly halting one of the rotational members, thereby reversibly converting the electric motor between a counter-rotating motor with both rotational members rotating in opposite directions and a standard motor with only one rotational member rotating. More specifically, comprising an embodiment of the subject invention for a vehicle adapted brushless counter-rotating wheel hub motor system is a power supply, a motor control means, a selected wheeled vehicle, a counter-rotating electric wheel hub motor with outer and inner rotational members, and reversible means for slowing and halting the inner rotational member (or outer rotational member, if so configured) when desired by a user. The brushless counter-rotating motor has two main halves that are rotationally mated with one another: 1) the armature or inner rotational member half/member and 2) the stator or outer rotational half/member, both of which freely rotate in opposite directions during operations. For the brushless traditional wheel hub motor, a wheel/tire is affixed to the perimeter of the outer rotating armature. For the brushless counter-rotating motor, a wheel/tire is affixed to the perimeter of the stator or outer rotational member and an output shaft is connected to and extends from the armature. For the brushless counter-rotating motor, the armature output shaft rotates in an opposite direction to the rotation of the stator. Thus, rotation reversal means are provided to change the rotation of the armature shaft to match the rotation direction of the stator. The rotational reversal means may be any suitable means including, but not limited to, planetary gearing, drive-chain twisting, coupled gears, and the like. For the brushless counter-rotating motor, the armature shaft is connected back to the hub motor containing wheel or to the second wheel. The reversible slowing and halting means, often a disc-brake assembly, is secured to the armature shaft and activated by a user via suitable means. Suitable rotational bearing assemblies are incorporated within a surrounding housing to support rotational mountings for the armature and stator, including at least one electrically conducting bearing assembly to carry one or more currents between an exterior and interior of the brushless counter-rotating motor or an equivalent non-brush electrical contact assembly. The subject brushless counter-rotating motor contains an electronic control means for commutating electrical pulses to the field magnets to create a rotational driving force (remembering that in traditional brushless motors the stator is a stationary component of the motor and does not rotate).

Further objects and aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only.

DETAILED DESCRIPTION OF THE INVENTION

Referring more specifically to the drawings, for illustrative purposes the present invention is presented in the embodiments generally shown in FIGS. 1 through 4. It will be appreciated that the subject invention may vary as to configuration and as to details of the parts without departing from the basic concepts as disclosed herein.

The subject invention comprises a counter-rotating motor that operates in a dual-mode fashion in which, upon the choice of a user or via suitable programming, the counter-rotating motor, with its oppositely rotating outer and inner rotational members, switches to a traditional motor in which only one rotational member rotates. The benefit of this dual-mode operation is that a motor's efficiency varies with many factors, including the relative rotational motion between the stator (outer rotational member) and the armature (inner rotational member). For a traditional motor only the armature spins and the stator in fixed and the overall motor output rpm value reflects only the rotational speed of the armature. For the counter-rotating motor both the stator and armature spin, but in opposite directions and the overall motor output rpm value reflects the combined rotational speeds of both the stator and armature. Increased motor efficiency and output power are usually noted at relatively high rotations between the stator and armature. Therefore, with the counter-rotating motor the internal relative rpm value between the stator and armature is twice that of the external rpm values for either the stator or armature, whereas with the traditional motor both the internal and external armature rpm value is the same. Thus, at lower external rpm values the counter-rotating motor achieves a higher efficiency and power output than the traditional motor. However, once the counter-rotating motor reaches higher internal rpm values the dual-mode operation of the subject invention permits (either automatic or manual) switching over to a traditional motor which has matching internal and external rpm values that are more efficient for a higher overall output velocity.

Figure 1:
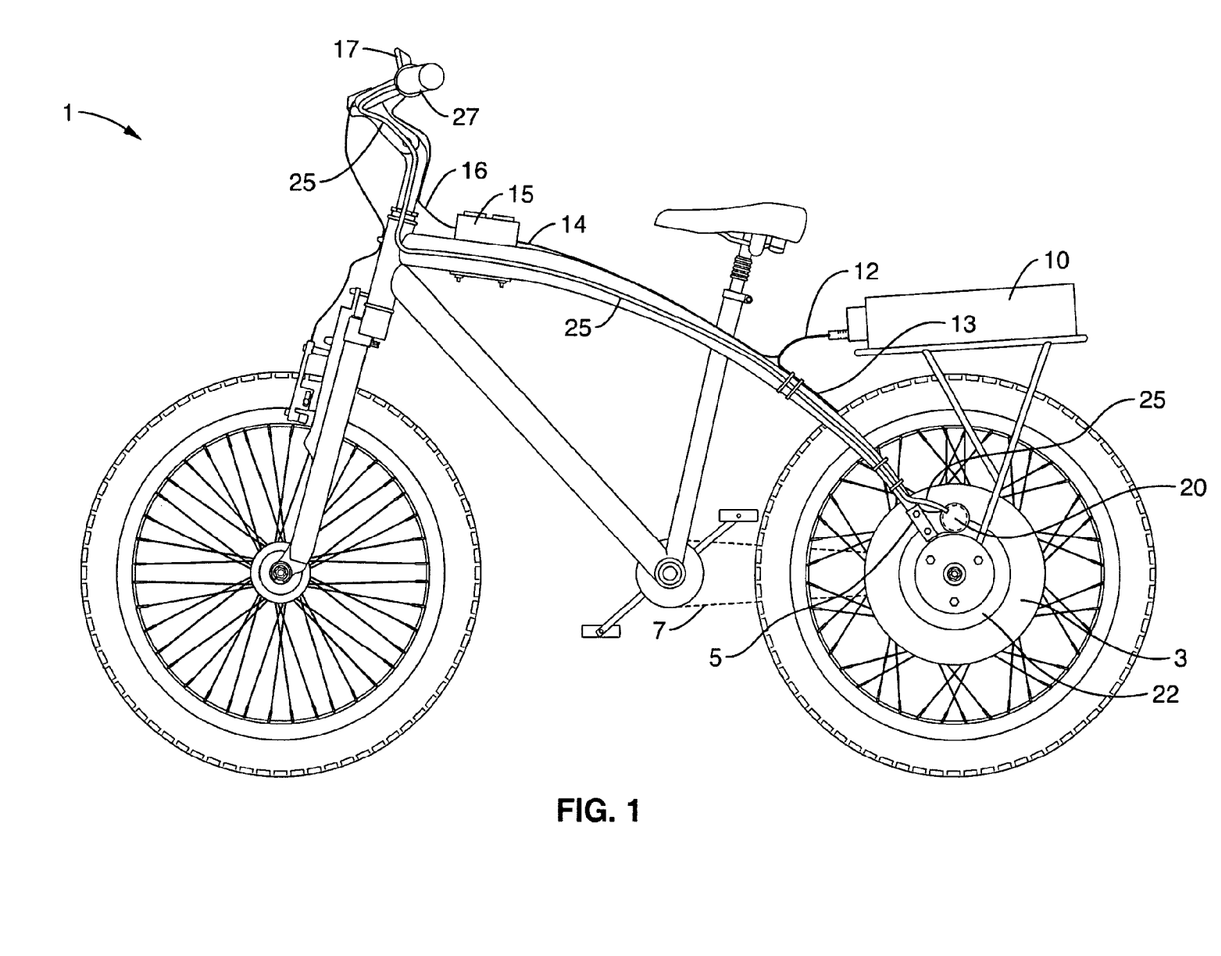
FIG. 1 is a perspective view of a bicycle adapted with the subject invention dual-mode counter-rotating motor system in which the rear wheel is powered in either a traditional motor mode or in a counter-rotating motor mode at the election of the operator of the bicycle.

Referring more specifically to the drawings, for illustrative purposes the subject counter-rotating electric motor powered system is shown in FIG. 1 in a first embodiment in which one wheel of a vehicle is powered by the electric motor. The exemplary vehicle is a bicycle, however, other electromechanical systems are contemplated as being within the realm of this invention/discloser, including but not limited to: general new and/or retro-fitted vehicles such as scooters, automobiles, trucks, motor homes, farm equipment, wheel chairs, air traveling devices such as airplanes and helicopters, water traveling devices such as underwater and surface devices, general industrial motors, general appliances and power tools, pumps, heat pumps, compressors, fans, general generator systems (water, wind, and the like), electrical charging systems, and like or similar or equivalent applications.

For the exemplary bicycle embodiment seen in FIG. 1, it is stressed that even though the rear wheel contains the dual-mode counter-rotating motor system, this is for illustrative purposes only and not by way of limitation, and the front wheel may also contain the counter-rotating motor system. Thus, it will be appreciated that the subject apparatus may vary as to configuration (e.g.: a motor powered front wheel or rear wheel or motor powered multiple wheels) and as to details of the parts without departing from the basic concepts as disclosed herein.

FIG. 1 show a bicycle 1 adapted with the subject dual-mode counter-rotating motor system. A dual-mode counter-rotating wheel hub motor 3 is mounted in the rear wheel of the bicycle and secured into the rear fork 5 of the bicycle frame. The bicycle chain 7 is still utilized by a rider to power the bicycle 1, if desired, and connects to a rear sprocket 8 (depicted in FIG. 2). A battery pack 10 is mounted to the bicycle in any suitable location. Power and control wires 12, 13, and 14 run from the batter pack 10 to the motor 3, to a volts/amps display monitor 15, and, via wire(s) 16, to a motor control unit 17 that the user accesses to electrically power the bicycle 1. An armature reversible halting means 20 (often pressure pads that are forced against a disk 22) is shown and the disk 22 upon which the halting means exerts pinching pressure to reversibly halt the rotation of the counter-rotating motor's armature. An armature halting activation cable 25 travels to a rider accessible region on the bicycle 1 and ends in an activation means 27 that is often a secured lever means or rotatable means secured to the handlebars of the bicycle (other equivalent locations and means are contemplated as being within the realm of this disclosure).

Figure 2:
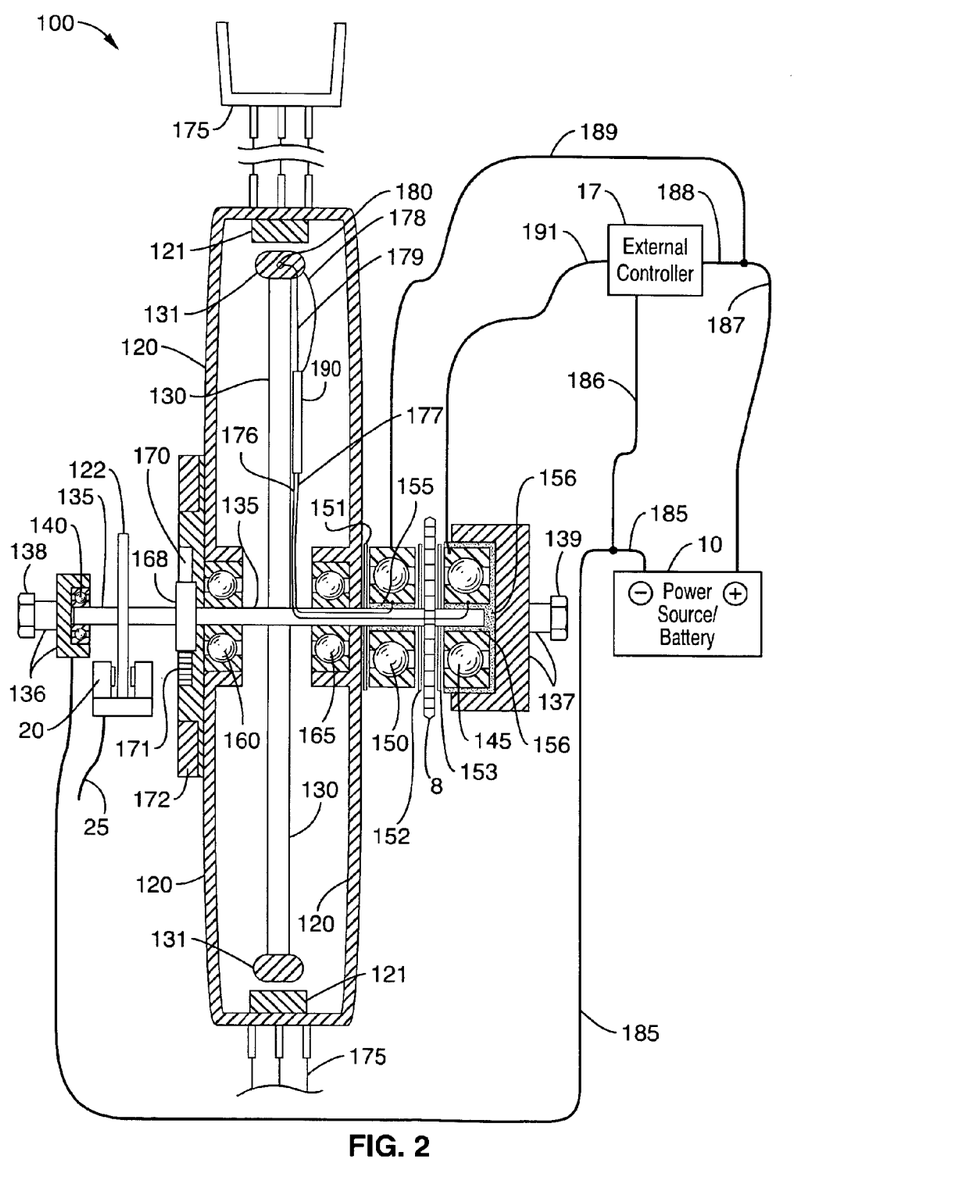
FIG. 2 is a partially expanded view of a first embodiment of the subject motor system in which a single wheel is powered in the subject dual-mode fashion by the counter-rotating motor.

FIG. 2 depicts the subject dual-mode counter-rotating motor system 100 in its single wheel embodiment. The single wheel embodiment drives one wheel in both the counter-rotating mode and in the standard/traditional mode and comprises a stator 120 or outer rotational member 120. Secured to the inner lining of the stator 120 are permanent magnets 121. Again, it is stressed that in this exemplary device the permanent magnets are associated with the stator or outer rotational member and the windings are on the armature or inner rotational member, but the permanent magnets may be positioned on the armature and the windings on the stator or electromagnets may substitute for the permanent magnets in either location.

Mounted within the stator 120 is an armature or inner rotational member 130 that is attached to a hollow armature axle or armature drive shaft 135. Located proximate the outer perimeter of the armature are windings or electromagnets 131. Axle-to-bike (in this exemplary embodiment, the rear fork 5) mounting brackets 136 and 137, with securing nuts 138 and 139. Proximate the ends of the axle 135 are bearing assemblies 140 (filled with electrically conducting grease for grounding purposes and readily obtainable from numerous public suppliers such as: Cool-Amp Conducto-Lube Company or Engineered Conductive Materials, LLC) and 145 (filled with electrically conducting grease for electrical communication between the external controller 17 and the internal controller 190 and, again, readily obtainable from numerous public suppliers such as: Cool-Amp Conducto-Lube Company or Engineered Conductive Materials, LLC). Bearing assembly 150 is also filled with the electrically conducting grease. Bearing assemblies 145 and 150 serve for electrical communication between the exterior controller 17 and the interior controller 190, with bearing assembly 140 serving as the grounding means (see below for further details). It is noted that other equivalent combination support/attachment and electrical communication configurations are considered to be within the realm of this disclosure.

Bearing assemblies 145 and 150 are electrically insulated from nearby components via spacer insulators 151, 152, and 153 and axle surrounding insulators 155 and 156. Insulator 156 also electrically insulates the bearing assembly 145 within mounting bracket 137. To permit the additional required rotation of both the armature 130 and stator 120 (counter-rotating to one another), bearing assemblies 160 and 165 facilitate stator 120 rotation about the armature axle 135. The bearing assemblies 140, 160, and 165 may or may not contain the electrically conducting grease depending upon the efficiency of various metal to metal grounding pathways.

Associated with the hollow armature axle 135 is an armature slowing and halting means. Again, one benefit of the counter-rotating motor is that it is much more energy efficient than a traditional motor and since the relative rotational motion of the stator and armature are the added sum of the output rotational motion for each half, a more efficient rotational speed (more efficient at higher than lower rpm values) is achieved more quickly than with a standard motor. Then, when decided by the user (or automatically decided by associated programming) one of the rotational members is slowed and halted, thereby creating a traditional motor. Preferably, the armature slowing and halting means comprises a disc member 22 (also seen in FIG. 1) secured to the axle 135 and a pressure plate assemble 20 (also seen in FIG. 1 and usually containing at least two pressure plates). The pressure plate assembly 20 is reversibly activated by the user/rider/operator of the device by engaging the assembly 20 via the connector cable 25 connected to an activation means such as a lever, rotatable force generator, and the like 27 that forces the pressure plates against the disc member 22 by hydraulic force, mechanical force, and/or equivalent forces. When the user desires (or under pre-programmed conditions) to switch between the counter-rotating version of the subject motor and the traditional version of the motor, the pressure plates of the pressure plate assembly 20 pinch the disc member 22, thereby slowing and halting the armature axle 135.

As indicated and usually, when operated by the user, the connector cable 25 runs from the pressure plate assembly 20 to a twist means, lever means, or the equivalent means 27 (generally located on the handle-bars or frame of a bike or similar location on other vehicles or devices) to initiate the slowing and halting force. The connector cable 25 may lead to a programmed actuator that is a portion of a controller or separate entity which initiates the armature slowing and halting process under pre-determined circumstances such as vehicle speed, armature rpm value, stator rpm value, relative armature-to-stator rpm value, or other desired standard. It is stressed that other equivalent means for halting the armature 135 are considered to be within the realm of this disclosure.

In the single wheel embodiment depicted in FIGS. 1 and 2, the armature axle 135 couples with a standard free-wheel assembly 168 that permits the stator/wheel 120 to rotate freely when the armature axle 135 is slowed and halted by pressure to assembly 20. Standard free-wheel devices permit locked rotation in one rotational direction and free rotation in the opposite rotational direction and have been used for many years in varied applications, but is an important element of the subject system. Again, although equivalent configurations are contemplated to be within the realm of this disclosure, the rotation direction of the armature axle 135 must be reversed to match the rotation direction of the stator 120 so that both drive the wheel in same direction. Again, the means for reversing the rotation direction of the armature 130 is necessary to mate in a common direction the stator/wheel 120 and armature 130 rotation directions to power the vehicle. Although equivalent means are contemplated and are within the realm of this disclosure, a suitable reversal-of-rotation means is a planetary gear assembly that includes an inner toothed-gear 170 that is secured to axle 135, at least one and commonly three intermediate toothed-gears 171, and an outer toothed-gear 172 that is affixed to the stator/wheel 120. The planetary gear assembly reverses the rotation of the armature axle 135 into a common rotational direction as the stator/wheel 120 which extends into the wheel/tire 175. It is stressed that the planetary gear means equivalent means are contemplated to be within the realm of this disclosure, including chains, belts, cables, gears, and the like. Additionally the reversal means may incorporate energy storing devices (resilient means, springs, and the like) to delay transmission of rotational forces between the two rotating members.

Many traditional free-wheel assemblies 168 are acceptable for use with the subject invention. One again, a free-wheel (or overrunning clutch) is a device that disengages the matched stator rotation and armature rotations when the armature axle 135 is slowed and halted, thus permitting the wheel/tire 175 to operate without the influence of the armature axle 135.

Once again, since both the armature 130 and stator 120 are rotating in opposite directions when the subject brushless motor system 100 is operating, it is impossible to deliver current to the windings 131 in any traditional manner. Thus, axle-insulated and electrically-conducting bearings 145 and 150 are mounted to and encircle the armature axle 135 (each one carrying a desired electric signal or current (via connected wires 176 and 177), usually extending from the internal controller 190 into one wire 178 for power to the windings 131 and one wire 179 for communication with the Hall Effect sensor(s) 180). Each bearing 145 and 150 is filled with electrically-conducting grease (again, readily obtainable from numerous public suppliers such as: Cool-Amp Conducto-Lube Company or Engineered Conductive Materials, LLC). Each bearing 145 and 150 is electrically insulated from the armature axle 135 (and other possible metal contacts) upon which they are mounted, by suitable cylindrical insulators 156 and 155, respectively. Additionally, bearings 145 and 150 are electrically insulated from neighboring components by suitable insulators 151, 152, and 153.

Electrical connections for the subject wheel hub motor system comprise electrically insulated wiring (again, traditional metal core and electrically insulating outer coating). Electrical power is supplied by a suitable power source/battery 10. The power source/battery 10 may be any suitable power source now known or later developed including Lead-Acid, Ni—Cd, Lithium ion, Fe-phosphate, and the like. The battery 10 is grounded to the bike frame via wire 185, as is the outside/exterior controller via wire 186. Usually, power wire 187 runs to a split point and divides into wire 188 and wire 189. Wire 188 continues from wire 187, at the split point, to the outside/exterior speed-on/off controller 17. The outside/exterior speed-on/off controller 17 is of standard acceptable configuration for activating and inactivating the subject motor and controlling its operational speed. Power wire 189 continues from wire 187, at the split point, and connects via electrically conducting bearing 150 and through insulator 155 to the inside/internal controller 190 via wire 177. The exterior speed-on/off controller 17 is connected by wire 191 to electrically conducting bearing 145 and then through insulator 156 and wire 176 to the internal controller 190.

The internal controller 190 transmits and coordinates the necessary electrical power required to operate the armature windings 131 with suitably pulsed current, pulse time detection means 180 (e.g.: Hall Effect sensors, back EMF techniques, and the like) connected to the controller 190 via wire 179. The internal controller 190 is illustrated as fastened to the armature 130. Once again, various commercial supply companies sell suitable brushless control units 190, including: the "Brushless Motor Cruise Controller—Programmable via PC USB port, Model BAC281P," the "High Power Brushless Motor Controller, Model HPC100B," and several other acceptable models from the Golden Motor Company of China and doing business in the U.S. (www.goldenmotor.com/) and Max Products International, LLC (www.maxx-prod.com/).

Again, each wire 189 and 191 electrically mate with the electrically conductive parts of each bearing 150 and 145, respectively. The electrically conductive grease permits free rotation of the inner portion of each bearing 145 and 150 while maintaining transmission of the electricity to the stationary outer portion of each bearing 145 and 150. Again, the bearings 145 and 150 are electrically connected via wires 176 and 177, respectively, to the internal controller 190.

The exterior controller 17 may be consolidated and located in one physical location or divided into separate physical locations on the modified vehicle, if desired (e.g.: an on-off switch on one side of the bicycle's handlebars and a speed controller on the other side of the handlebars and the like).

Once again, a power source, battery, or battery pack 10 is normally included to power the subject device. The power source 10 is connected to the electronic elements of the subject system via wires 185 and 187. Frequently, the positive connection 187 runs directly to the exterior controller 17 and indirectly to the interior controller 190 and the negative connection 185 runs to an appropriate location of the vehicle's frame, axle, or the like, for grounding.

Figure 3:
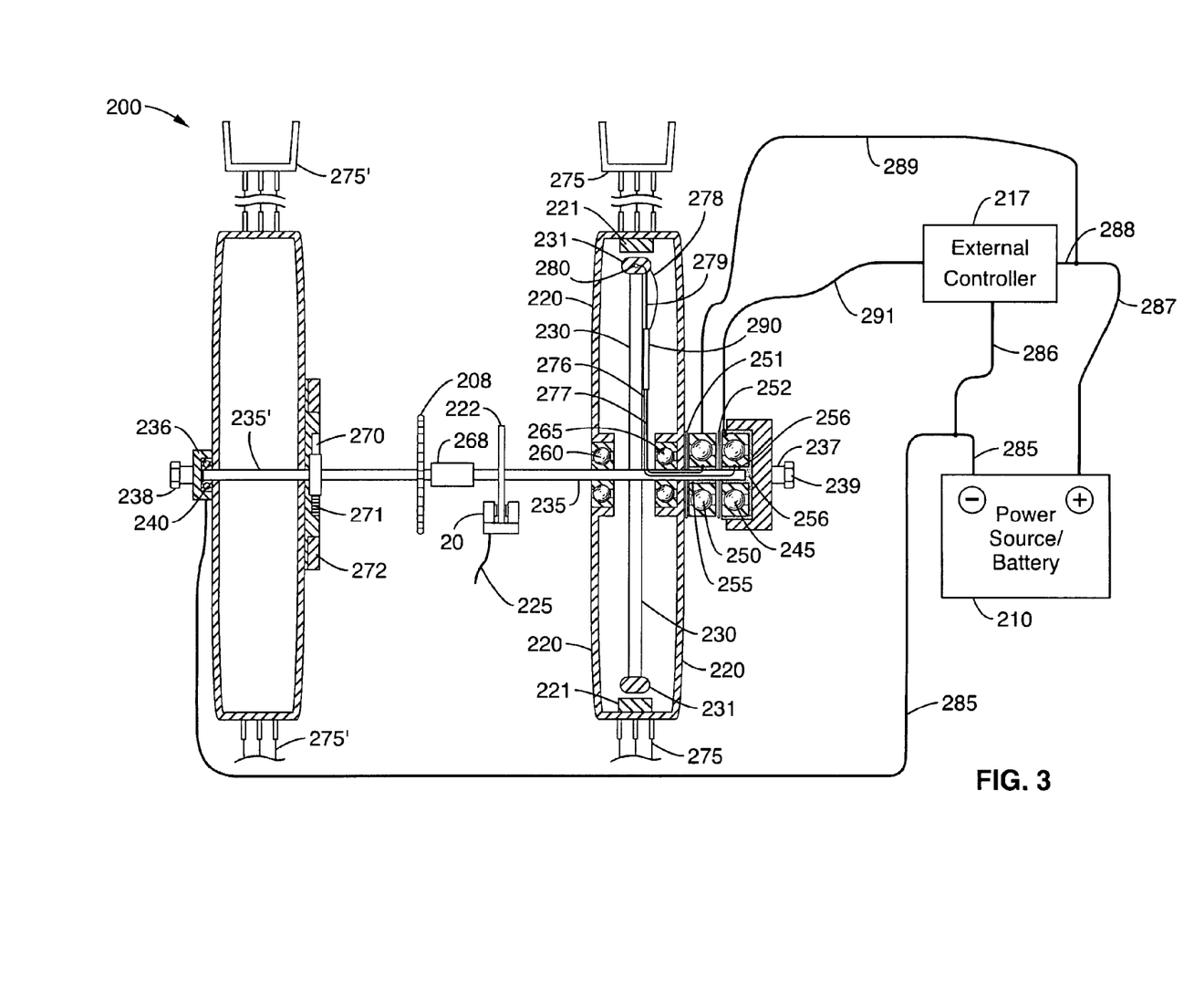
FIG. 3 is a partially expanded view of a second embodiment of the subject motor system in which two wheels are powered in the subject dual-mode fashion by the counter-rotating motor.
Figure 4:
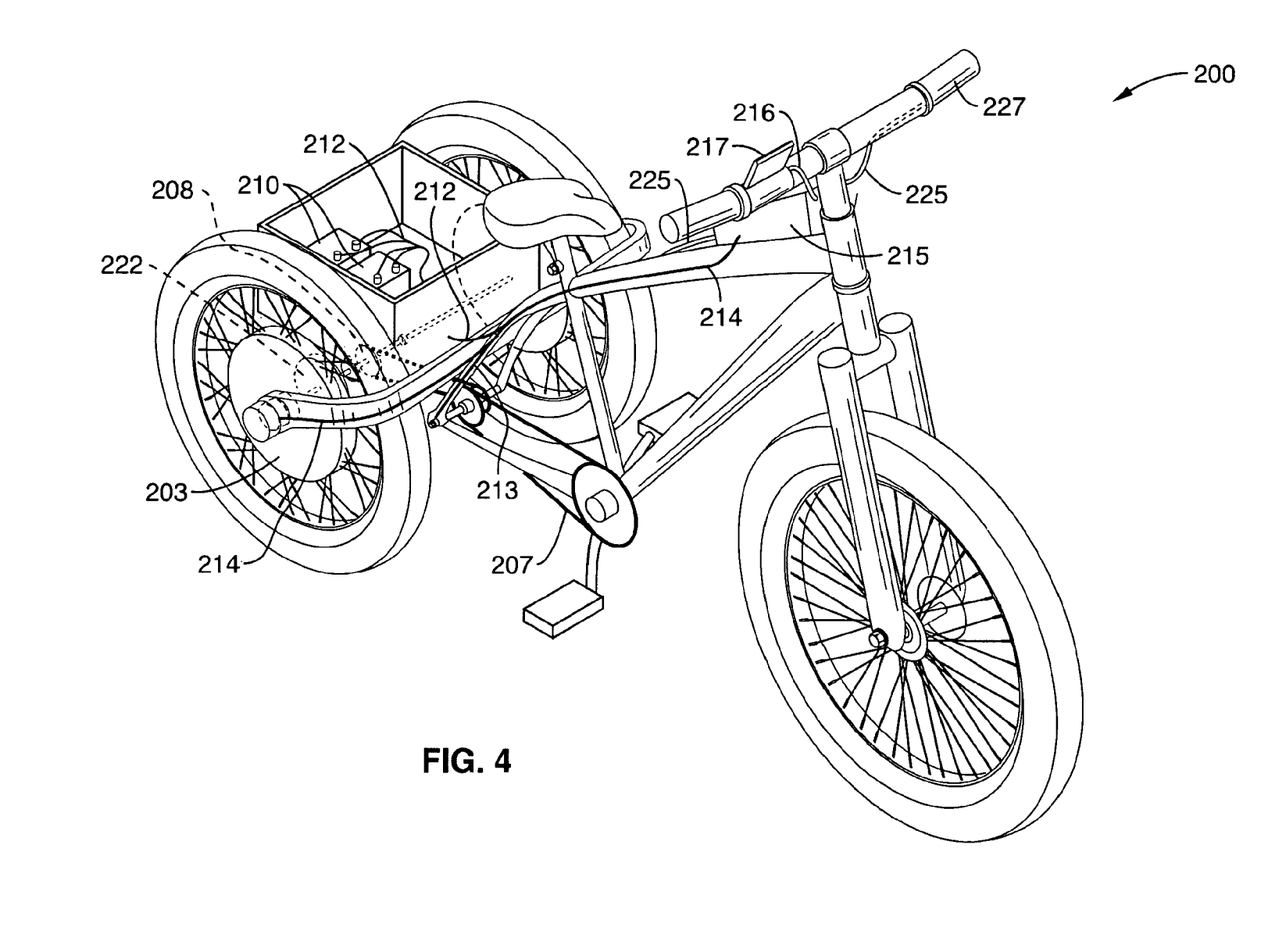
FIG. 4 is a is a perspective view of a tricycle adapted with the subject invention dual-mode counter-rotating system in which either one rear wheel or both rear wheels are powered as elected by the operator of the tricycle.

FIGS. 3 and 4 depict the subject system incorporated into a tricycle 200 vehicle in which the subject dual-mode counter-rotating motor system drives two wheels in the counter-rotating mode and one wheel in the standard mode and comprises a stator 220 or outer rotational member 220. Secured to the inner lining of the stator 220 are permanent magnets 221. It is stressed that in this exemplary device the permanent magnets are associated with the stator or outer rotational member and the windings are on the armature or inner rotational member, but the permanent magnets may be positioned on the armature and the windings on the stator or electromagnets may substitute for the permanent magnets in either location.

More specifically in reference to FIG. 4 and the depicted exemplary subject invention adapted tricycle 200, a dual-mode counter-rotating wheel hub motor 203 is mounted in one of the rear wheels of the tricycle and both rear wheels are appropriately secured to the tricycle frame. The tricycle chain 207 is still utilized by a rider to power the tricycle 200, if desired, and connects, via suitable linkages, to a rear sprocket 208. A battery pack or packs 210 is/are mounted to the tricycle in any suitable location (e.g.: FIG. 4 depicts a rear carrying region). Power and control wires 212, 213, and 214 run from the batter pack(s) 210 to the motor 203, to a volts/amps display monitor 215, and, via wire(s) 216, to a motor control unit 217 that the user accesses to electrically power the adapted tricycle 200. An armature reversible halting means (not shown in FIG. 4, but shown in FIG. 3 is often pressure pads that are forced against a disk 222) is activated by cable 225. Cable 225 travels from the armature reversible halting means to a rider accessible region on the tricycle 200 and ends in an activation means 227 that is often a rotatable means 227 or lever means secured to the handlebars of the tricycle 200 (other equivalent locations and means are contemplated as being within the realm of this disclosure).

Again focusing particularly on FIG. 3, mounted within the stator 220 is an armature or inner rotational member 230 that is attached to a hollow armature axle or armature drive shaft 235. Located proximate the outer perimeter of the armature are windings or electromagnets 231. Axle-to-bike mounting brackets 236 and 237 and securing nuts 238 and 239 are located at each end of the axle 235 as are bearing assemblies 240 (filled with electrically conducting grease for grounding purposes and readily obtainable from numerous public suppliers such as: Cool-Amp Conducto-Lube Company or Engineered Conductive Materials, LLC) and 245 (filled with electrically conducting grease (as is bearing assembly 150) for electrical communication between the external controller 217 and the internal controller 290 and, again, readily obtainable from numerous public suppliers such as: Cool-Amp Conducto-Lube Company or Engineered Conductive Materials, LLC). Bearing assembly 250 is also filled with the electrically conducting grease. Bearing assemblies 245 and 250 serve for electrical communication between the exterior controller 217 and the interior controller 290, with bearing assembly 240 serving as the grounding means (see below for further details). It is noted that other equivalent combination support/attachment and electrical communication configurations are considered to be within the realm of this disclosure.

Bearing assemblies 245 and 250 are electrically insulated from nearby components via spacer insulators 251 and 252 and axle surrounding insulators 255 and 256. To permit the additional required rotation of both the armature 230 and stator 220 (counter-rotating to one another), bearing assemblies 260 and 265 (both usually filled with electrically conducting grease for grounding purposes) facilitate stator 220 rotation about the armature axle 235.

Associated with the hollow armature axle 235 is an armature slowing and halting means. Again, one benefit of the counter-rotating motor is that it is much more energy efficient than a traditional motor and since the relative rotational motion of the stator and armature are the added sum of the output rotational motion for each half, a more efficient rotational speed (more efficient at higher than lower rpm values) is achieved more quickly than with a standard motor. Once again, then, when decided by the user (or automatically decided by associated programming), one of the rotational members is slowed and halted, thereby creating a traditional motor. Preferably, the armature slowing and halting means comprises a disc member 222 (seen in FIGS. 3 and 4) secured to the axle 235 and a pressure plate assemble 220 (usually containing at least two pressure plates). The pressure plate assembly 220 is reversibly activated by the user/rider/operator of the device by engaging the assembly 220 via the connector cable 225 connected to an activation means such as a rotatable force generator 227 (see FIG. 4 for a hand grip rotatable member 227), lever, and the like that forces the pressure plates against the disc member 222 by hydraulic force, mechanical force, and/or equivalent forces. When the user desires (or under pre-programmed conditions) to switch between the counter-rotating version of the subject motor and the traditional version of the motor, the pressure plates of the pressure plate assembly 220 pinch the disc member 222, thereby slowing and halting the armature axle 235. As noted, a current tricycle embodiment utilizes a handlebar mounted assembly 227 that, when rotated, tightens a cable to the plate assembly 220 and forces the pressure plates together on the disc 222.

It is noted that when operated by the user, the connector cable 225 runs from the pressure plate assembly 220 to a twist means 227, lever means, or the equivalent means (generally located on the handle-bars or frame of a bike or similar location on other vehicles or devices) to initiate the slowing and halting force. The connector cable 225 may lead to a programmed actuator that is a portion of a controller or separate entity which initiates the armature slowing and halting process under pre-determined circumstances such as vehicle speed, armature rpm value, stator rpm value, relative armature-to-stator rpm value, or other desired standard.

Although equivalent configurations are contemplated to be within the realm of this disclosure, in this second two-wheel-powered embodiment the armature axle 235 couples with a standard free-wheel assembly 268 that permits the second wheel 275' to rotate freely when the armature axle 235 is slowed and halted by pressure to assembly 220. A second axle 235' extends from the free-wheel assembly 268 through the second wheel 275' and into bearing 240 that is held in bracket 236. Analogous with the first wheel 275 that contains the hub motor, the second wheel 275' extends into the wheel/tire region. It is stressed that mounting brackets 236 and 237 are utilized to help secure the wheels to the vehicle, however, alternate and equivalent means for assembling the motor/drive means to vehicle are also within the realm of this disclosure. Also, attached to the second axle 235' is a sprocket 208 upon which a chain is attached to pedal mean associated with the vehicle (the vehicle user may pedal the vehicle to move it without added power from the subject motor).

A means for reversing the rotation direction of the armature is necessary to mate the stator and armature rotation directions. Although equivalent means are contemplated, a suitable reversal-of-rotation means is shown in FIG. 3 and comprises a planetary gear assembly that includes an inner toothed-gear 270 that is secured to the second axle 235', at least one and frequently three intermediate toothed-gears 271, and an outer toothed-gear 272 that is affixed to the second wheel 275'. The planetary gear assembly reverses the rotation of the armature axle 235 into a common rotational direction as the first wheel/tire 275. It is stressed that the planetary gear means are contemplated to be within the realm of this disclosure, including chains, belts, cables, gears, and the like and may incorporated energy storing devices (resilient means, springs, and the like) to delay transmission of the rotational force to the other wheel.

Once again, since both the armature 230 and stator 220 are rotating in opposite directions when the subject brushless motor is operating, it is impossible to deliver current to the windings 231 in any traditional manner. Thus, axle-insulated, electrically-conducting bearings 245 and 250 are mounted to and encircle the armature axle 235 (each one carrying a desired electric signal or current (via connected wires 276 and 277), usually extending from the internal controller 291 into one wire 278 for power to the windings 231 and one wire 279 for communication with the Hall Effect sensor(s) 280). Each bearing 245 and 250 is filled with electrically-conducting grease (again, readily obtainable from numerous public suppliers such as: Cool-Amp Conducto-Lube Company or Engineered Conductive Materials, LLC). Each bearing 245 and 250 is electrically insulated from the armature axle 235, upon which they are mounted, by suitable cylindrical insulators 256 and 255, respectively. Additionally, bearings 245 and 250 are electrically insulated from neighboring components by suitable insulators 251 and 256 (additionally, insulator 257 insulates into bracket 237).

Electrical connections for the subject wheel hub motor comprise electrically insulated wiring (again, traditional metal core and electrically insulating outer coating). Electrical power is supplied by a suitable battery 210 (this may be any suitable power source), now known or later developed (Lead-Acid, Ni—Cd, Lithium ion, Fe-phosphate, and the like). The battery is grounded to the bike frame via wire 285, as is the outside controller via wire 286. Usually, power wire 287 runs to a split point and divides into wire 288 and wire 289. Wire 288 continues from wire 287, at the split point, to the outside/exterior speed-on/off controller 217. The outside speed-on/off controller 217 is of standard acceptable configuration for activating and inactivating the subject motor and controlling its operational speed. Power wire 289 continues from wire 287, at the split point, and connects via electrically conducting bearing 250 and through insulator 255 to the inside/internal controller 290 via wire 277. The speed-on/off controller 217 is connected by wire 291 to electrically conducting bearing 245 and then through insulator 256 and wire 276 to the internal controller 290. Power to the windings 231 come from the controller 290 via wire 278.

The internal controller 290 transmits and coordinates the necessary electrical power required to operate the armature windings 231 with suitably pulsed current, pulse time detection means 280 (e.g.: Hall Effect sensors, back EMF techniques, and the like) connected to the controller 290 via wire 279. The internal controller 290 is illustrated as fastened to the armature 230. Once again, various commercial supply companies sell suitable brushless control units 290, including: the "Brushless Motor Cruise Controller—Programmable via PC USB port, Model BAC281P," the "High Power Brushless Motor Controller, Model HPC100B," and several other acceptable models from the Golden Motor Company of China and doing business in the U.S. (www.goldenmotor.com/) and Max Products International, LLC (www.maxxprod.com/).

Again, each wire 289 and 291 penetrate the cylindrical insulators 255 and 256, respectively and electrically mate with the electrically conductive parts of each bearing 250 and 245, respectively. The electrically conductive grease permits free rotation of the inner portion of each bearing 245 and 250 while transmitting the electricity to the stationary outer portion of each bearing 245 and 250. Again, the bearings 245 and 250 are electrically connected via wires 276 and 277 (both wires penetrating the insulators 256 and 255, respectively), respectively, to the internal controller 290.

The exterior controller 217 may be consolidated and located in one physical location or divided into separate physical locations on the modified vehicle, if desired (e.g.: an on-off switch on one side of the tricycle's handlebars and a speed controller on the other side of the handlebars).

Once again, a power source, battery, or battery pack 210 is normally included to power the subject device. The power source 210 is connected to the electronic elements of the subject system via wires 285 and 287. Frequently, the positive connection 287 runs to the exterior controller 217 and the negative connection 285 runs to an appropriate location of the vehicle's frame, axle, or the like, for grounding.

As is clearly seen in FIG. 3, the stator or outer rotational member 220 is continuous with the outer wheel support 275 that extends into attached spokes, an outer wheel rim, and a tire.

Clearly, although a hub mounted counter-rotating motor in a bicycle and tricycle have been used for exemplary purposes to demonstrate the subject dual-mode counter-rotating motor system, any counter-rotating motor is acceptable and either the armature or the stator may be slowed and halted in an equivalent manner to switch between a standard/traditional motor with one rotating member and a counter-rotating motor with two oppositely rotating members.

Generally, the subject invention is a dual-mode counter-rotating-to-traditional electric motor system that includes an outer rotational member, wherein the outer rotating member rotates in a first direction about a central axis, an inner rotational member configured to rotate within the outer rotational member about the central axis, wherein the inner rotating member rotates in a second direction that is opposite to the first direction; and means for reversibly halting one of the rotational members, thereby reversibly converting the electric motor between a counter-rotating motor with both rotational members rotating in opposite directions and a standard motor with only one rotational member rotating.

Once again, for clarity, the counter-rotating electric motor system comprises an outer rotational member, wherein the outer rotating member rotates in a first direction about a central axis, an inner rotational member configured to rotate within the outer rotational member about the central axis, wherein the inner rotating member rotates in a second direction that is opposite to the first direction, a first force output means coupled to the outer rotational member, a second force output means coupled to the inner rotational member, and means for reversibly slowing and halting one of the rotational members, thereby converting the counter-rotating electric motor into a traditional motor with one rotating rotational member and one reversibly halted rotational member.

Further, the subject counter-rotating electric motor comprises means for disengaging continued rotation of the rotating rotational member from the slowed and halted rotational member, thereby permitting the rotating rotational member to continue rotating. Often the reversible slowing and halting means comprises a braking assembly associated with one of the first and second force output means. Frequently, the reversible slowing and halting means comprises a disc-braking assembly associated with one of the first and second force output means. Also, the reversible slowing and halting means comprises a braking assembly associated with the second force output means. Preferably, the reversible slowing and halting means comprises a disc-braking assembly associated with the second force output means.

Often, the disengaging means comprises a free-wheel assembly and the equivalent in which rotation is unrestricted in one rotational direction and stopped in the reverse rotational direction.

Further, the subject counter-rotating electric wheel hub motor system comprises an outer rotational member that extends into a wheel rim, wherein the outer rotating member rotates in a first direction about a central axis, an inner rotational member configured to rotate within the outer rotational member about the central axis, wherein the inner rotating member rotates in a second direction that is opposite to the first direction, a first force output means coupled to the outer rotational member, a second force output means coupled to the inner rotational member, means for powering the wheel hub motor system, thereby rotating the outer and inner rotational members in opposite directions, means for reversibly slowing and halting the inner rotational member, thereby converting the counter-rotating electric wheel hub motor system into a traditional wheel hub motor system with the outer rotational member rotating and the inner rotational member reversibly halted, and means for disengaging continued rotation of the outer rotational member from the slowed and halted inner rotational member, thereby permitting the outer rotational member to continue rotating.

Additionally, the reversible slowing and halting means often comprises a braking assembly associated with the second force output means. In addition, the reversible slowing and halting means frequently comprises a disc-braking assembly associated with the second force output means.

Usually, the disengaging means comprises a free-wheel assembly or an equivalent means.

Preferably, the brushless counter-rotating electric DC/AC motor system, comprises an outer rotational member, wherein the outer rotating member rotates in a first direction about a central axis, an inner rotational member configured to rotate within the outer rotational member about the central axis, wherein the inner rotating member rotates in a second direction that is opposite to the first direction, a first force output means coupled to the outer rotational member, a second force output means coupled to the inner rotational member, means for powering the counter-rotating DC/AC motor system, thereby rotating the outer and inner rotational members in opposite directions, means for reversibly slowing and halting one of the rotational members, thereby converting the brushless counter-rotating electric DC/AC motor system into a traditional motor system with one rotating rotational member and one reversibly halted rotational member, and means for disengaging continued rotation of the rotating rotational member from the slowed and halted rotational member, thereby permitting the rotating rotational member to continue rotating.

Further, for the brushless counter-rotating electric DC/AC motor system the reversible slowing and halting means comprises a braking assembly associated with one of the first and second force output means. Often, the reversible slowing and halting means comprises a disc-braking assembly associated with one of the first and second force output means. Frequently, the reversible slowing and halting means comprises a braking assembly associated with the second force output means. Usually, the reversible slowing and halting means comprises a disc-braking assembly associated with the second force output means.

Preferably, the disengaging means comprises a free-wheel assembly and/or equivalent means and systems.

It is pointed out that the subject counter-rotating electric DC/AC wheel hub motor system comprises an outer rotational member that extends into a wheel rim and associated tire, wherein the outer rotating member rotates in a first direction about a central axis, an inner rotational member configured to rotate within the outer rotational member about the central axis, wherein the inner rotating member rotates in a second direction that is opposite to the first direction, a force output coupling means, wherein the force output coupling means reverses rotation of the inner rotational member to create output rotation in the first direction and couples the output rotation with the outer rotational member rotation, means for powering the wheel hub motor, thereby rotating the outer and inner rotational members in opposite directions, means for reversibly slowing and halting the inner rotational member, thereby converting the brushless counter-rotating electric DC/AC wheel hub motor system into a traditional brushless DC/AC wheel hub motor system with the outer rotational member rotating when the inner rotational member is reversibly halted, and means for disengaging continued rotation of the outer rotational member from the slowed and halted inner rotational member, thereby permitting the outer rotational member to continue rotating.

Disclosed for the brushless counter-rotating electric DC/AC wheel hub motor system, the reversible slowing and halting means comprises a braking assembly associated with the force output coupling means. Often, the reversible slowing and halting means comprises a disc-braking assembly associated with the force output coupling means.

Preferably, the disengaging means comprises a free-wheel assembly and/or equivalent means to allow free rotation in one rotational direction and inhibited rotation in the opposite rotational direction.

In further regard to the subject invention, the counter-rotating electric DC/AC wheel hub motor system comprises an outer rotational member that extends into a first wheel rim and associated first tire, wherein the outer rotating member rotates in a first direction about a central axis, an inner rotational member configured to rotate within the outer rotational member about the central axis, wherein the inner rotating member rotates in a second direction that is opposite to the first direction, a force output coupling means, wherein the force output coupling means reverses rotation of the inner rotational member to create output rotation in the first direction and couples the output rotation to a second wheel and associated second tire, means for powering the wheel hub motor, thereby rotating the outer and inner rotational members in opposite directions, means for reversibly slowing and halting the inner rotational member, thereby converting the brushless counter-rotating electric DC/AC wheel hub motor system into a traditional brushless DC/AC wheel hub motor system with the outer rotational member rotating when the inner rotational member is reversibly halted, and means for disengaging continued rotation of the outer rotational member from the slowed and halted inner rotational member, thereby permitting the outer rotational member to continue rotating.

Again looking at the subject brushless counter-rotating electric DC/AC wheel hub motor system, the reversible slowing and halting means comprises a braking assembly associated with the force output coupling means. Often, the reversible slowing and halting means comprises a disc-braking assembly associated with the force output coupling means.

Again, for the counter-rotating electric DC/AC wheel hub motor system the disengaging means comprises a free-wheel assembly and equivalent structures.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A dual-mode counter-rotating-to-traditional electric motor system, comprising:
   a. an outer rotational member, wherein said outer rotating member rotates in a first direction about a central axis;
   b. an inner rotational member configured to rotate within said outer rotational member about said central axis, wherein said inner rotating member rotates in a second direction that is opposite to said first direction; and
   c. means for reversibly halting one of said rotational members, thereby reversibly converting said electric motor system between a counter-rotating motor with both rotational members rotating in opposite directions and a standard motor with only one rotational member rotating.

2. A counter-rotating electric motor, comprising:
   a. an outer rotational member, wherein said outer rotating member rotates in a first direction about a central axis;
   b. an inner rotational member configured to rotate within said outer rotational member about said central axis, wherein said inner rotating member rotates in a second direction that is opposite to said first direction;
   c. a first force output means coupled to said outer rotational member;
   d. a second force output means coupled to said inner rotational member; and
   e. means for reversibly slowing and halting one of said rotational members, thereby converting the counter-rotating electric motor into a traditional motor with one rotating rotational member and one reversibly halted rotational member.

3. A counter-rotating electric motor according to claim 2, further comprising means for disengaging continued rotation of said rotating rotational member from said slowed and halted rotational member, thereby permitting said rotating rotational member to continue rotating.

4. A counter-rotating electric motor according to claim 2, wherein said reversible slowing and halting means comprises a braking assembly associated with one of said first and second force output means.

5. A counter-rotating electric motor according to claim 2, wherein said reversible slowing and halting means comprises a disc-braking assembly associated with one of said first and second force output means.

6. A counter-rotating electric motor according to claim 2, wherein said reversible slowing and halting means comprises a braking assembly associated with said second force output means.

7. A counter-rotating electric motor according to claim 2, wherein said reversible slowing and halting means comprises a disc-braking assembly associated with said second force output means.

8. A counter-rotating electric motor according to claim 3, wherein said disengaging means comprises a free-wheel assembly.

9. A counter-rotating electric wheel hub motor system, comprising:
   a. an outer rotational member that extends into a wheel rim, wherein said outer rotating member rotates in a first direction about a central axis;
   b. an inner rotational member configured to rotate within said outer rotational member about said central axis, wherein said inner rotating member rotates in a second direction that is opposite to said first direction;
   c. a first force output means coupled to said outer rotational member;
   d. a second force output means coupled to said inner rotational member;
   e. means for reversibly slowing and halting said inner rotational member, thereby converting the counter-rotating electric wheel hub motor system into a traditional wheel hub motor system with said outer rotational member rotating and said inner rotational member reversibly halted; and
   f. means for disengaging continued rotation of said outer rotational member from said slowed and halted inner rotational member, thereby permitting said outer rotational member to continue rotating.

10. A counter-rotating electric wheel hub motor system according to claim 9, wherein said reversible slowing and halting means comprises a braking assembly associated with said second force output means.

11. A counter-rotating electric wheel hub motor system according to claim 9, wherein said reversible slowing and halting means comprises a disc-braking assembly associated with said second force output means.

12. A counter-rotating electric wheel hub motor system according to claim 9, wherein said disengaging means comprises a free-wheel assembly.

13. A brushless counter-rotating electric DC/AC motor system, comprising:
   a. an outer rotational member, wherein said outer rotating member rotates in a first direction about a central axis;
   b. an inner rotational member configured to rotate within said outer rotational member about said central axis, wherein said inner rotating member rotates in a second direction that is opposite to said first direction;
   c. a first force output means coupled to said outer rotational member;
   d. a second force output means coupled to said inner rotational member;
   e. means for reversibly slowing and halting one of said rotational members, thereby converting the brushless counter-rotating electric DC/AC motor system into a traditional motor system with one rotating rotational member and one reversibly halted rotational member; and
   f. means for disengaging continued rotation of said rotating rotational member from said slowed and halted rotational member, thereby permitting said rotating rotational member to continue rotating.

14. A brushless counter-rotating electric DC/AC motor system according to claim 13, wherein said reversible slowing and halting means comprises a braking assembly associated with one of said first and second force output means.

15. A brushless counter-rotating electric DC/AC motor system according to claim 13, wherein said reversible slowing and halting means comprises a disc-braking assembly associated with one of said first and second force output means.

16. A brushless counter-rotating electric DC/AC motor system according to claim 13, wherein said reversible slowing and halting means comprises a braking assembly associated with said second force output means.

17. A brushless counter-rotating electric DC/AC motor system according to claim 13, wherein said reversible slowing and halting means comprises a disc-braking assembly associated with said second force output means.

18. A brushless counter-rotating electric DC/AC motor system according to claim 13, wherein said disengaging means comprises a free-wheel assembly.

19. A counter-rotating electric DC/AC wheel hub motor system, comprising:
   a. an outer rotational member that extends into a wheel rim and associated tire, wherein said outer rotating member rotates in a first direction about a central axis;
   b. an inner rotational member configured to rotate within said outer rotational member about said central axis, wherein said inner rotating member rotates in a second direction that is opposite to said first direction;
   c. a force output coupling means, wherein said force output coupling means reverses rotation of said inner rotational member to create output rotation in said first direction and couples said output rotation with said outer rotational member rotation;
   d. means for powering the wheel hub motor, thereby rotating said outer and inner rotational members in opposite directions;
   e. means for reversibly slowing and halting said inner rotational member, thereby converting the brushless counter-rotating electric DC/AC wheel hub motor system into a traditional brushless DC/AC wheel hub motor system with said outer rotational member rotating when said inner rotational member is reversibly halted; and
   f. means for disengaging continued rotation of said outer rotational member from said slowed and halted inner rotational member, thereby permitting said outer rotational member to continue rotating.

20. A brushless counter-rotating electric DC/AC wheel hub motor system according to claim 19, wherein said reversible slowing and halting means comprises a braking assembly associated with said force output coupling means.

21. A brushless counter-rotating electric DC/AC wheel hub motor system according to claim 19, wherein said reversible slowing and halting means comprises a disc-braking assembly associated with said force output coupling means.

22. A brushless counter-rotating electric DC/AC wheel hub motor system according to claim 19, wherein said disengaging means comprises a free-wheel assembly.

23. A brushless counter-rotating electric DC/AC wheel hub motor system, comprising:
   a. an outer rotational member that extends into a first wheel rim and associated first tire, wherein said outer rotating member rotates in a first direction about a central axis;
   b. an inner rotational member configured to rotate within said outer rotational member about said central axis, wherein said inner rotating member rotates in a second direction that is opposite to said first direction;
   c. a force output coupling means, wherein said force output coupling means reverses rotation of said inner rotational member to create output rotation in said first direction and couples said output rotation to a second wheel and associated second tire;
   d. means for powering the wheel hub motor, thereby rotating said outer and inner rotational members in opposite directions;
   e. means for reversibly slowing and halting said inner rotational member, thereby converting the brushless counter-rotating electric DC/AC wheel hub motor system into a traditional brushless DC/AC wheel hub motor system with said outer rotational member rotating when said inner rotational member is reversibly halted; and
   f. means for disengaging continued rotation of said outer rotational member from said slowed and halted inner rotational member, thereby permitting said outer rotational member to continue rotating.

24. A brushless counter-rotating electric DC/AC wheel hub motor system according to claim 23, wherein said reversible slowing and halting means comprises a braking assembly associated with said force output coupling means.

25. A brushless counter-rotating electric DC/AC wheel hub motor system according to claim 23, wherein said reversible slowing and halting means comprises a disc-braking assembly associated with said force output coupling means.

26. A brushless counter-rotating electric DC/AC wheel hub motor system according to claim 23, wherein said disengaging means comprises a free-wheel assembly.

\* \* \* \* \*